(12) United States Patent
Sato et al.

(10) Patent No.: US 10,789,155 B2
(45) Date of Patent: Sep. 29, 2020

(54) COVERAGE TEST SUPPORT DEVICE AND COVERAGE TEST SUPPORT METHOD

(71) Applicant: HITACHI, LTD., Tokyo (JP)

(72) Inventors: Naoto Sato, Tokyo (JP); Tomoyuki Myojin, Tokyo (JP); Yuichiroh Nakagawa, Tokyo (JP); Hironobu Kuruma, Tokyo (JP); Hideto Noguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 81 days.

(21) Appl. No.: 16/230,803

(22) Filed: Dec. 21, 2018

(65) Prior Publication Data

US 2019/0196943 A1    Jun. 27, 2019

(30) Foreign Application Priority Data

Dec. 26, 2017    (JP) ................. 2017-248710

(51) Int. Cl.
| | | |
|---|---|---|
| *G06F 11/36* | (2006.01) | |
| *G06N 3/08* | (2006.01) | |
| *G06N 3/04* | (2006.01) | |

(52) U.S. Cl.
CPC ...... *G06F 11/3676* (2013.01); *G06F 11/3688* (2013.01); *G06F 11/3692* (2013.01); *G06N 3/04* (2013.01); *G06N 3/084* (2013.01)

(58) Field of Classification Search
CPC ............. G06F 11/3676; G06F 11/3688; G06F 11/3692; G06N 3/04; G06N 3/084; G06N 3/02

See application file for complete search history.

(56) References Cited

U.S. PATENT DOCUMENTS

2018/0096247 A1*  4/2018  Maruhashi ............... G06K 9/66
2018/0233133 A1*  8/2018  Hilal ........................ G10L 15/22
(Continued)

FOREIGN PATENT DOCUMENTS

JP    2010-146037 A    7/2010
JP    2015-200984 A    11/2015

OTHER PUBLICATIONS

Pei et al., "Automated Whitebox Testing of Deep Learning Systems", SOSP '17, Columbia University.
(Continued)

*Primary Examiner* — Matthew M Kim
*Assistant Examiner* — Indranil Chowdhury
(74) *Attorney, Agent, or Firm* — Volpe and Koenig, P.C.

(57) ABSTRACT

A coverage test support device includes a memory device that stores a test case and specification content of each of a plurality of coverage indexes, and an arithmetic device that sequentially gives a test input value of each pair in the test case to a program created by a neural network, executes a predetermined number of tests, and acquires a test result of the tests and neuron information at the time of test execution, applies the acquired neuron information to the specification content of each coverage indexes and calculates a value for each coverage index, and identifies, among the coverage indexes, a coverage index in which an elongation rate of the calculated value shows a predetermined tendency, as a preferential coverage index that is to be used preferentially, when either the number of executions of the tests or the number of bugs in the test result exceeds a predetermined standard.

6 Claims, 8 Drawing Sheets

(56) References Cited

U.S. PATENT DOCUMENTS

2019/0196952 A1\* 6/2019 Manchiraju ......... G06F 11/3676
2019/0258934 A1\* 8/2019 Sorokin ................ G06N 3/084

OTHER PUBLICATIONS

Extended European Search Report dated Apr. 12, 2019 for the European Patent Application No. 18214895.7.
Tian et al., "DeepTest: Automated Testing of Deep-Neural-Network-driven Autonomous Cars," 2018 ACM/IEEE 40th International Conference on Software Engineering, pp. 303-314, XP055572164 (May 27, 2018).

\* cited by examiner

TEST CASE 1111

| CASE | TEST INPUT VALUE | EXPECTED OUTPUT VALUE |
|---|---|---|
| 1 | test1001.dat | 1 |
| 1 | test1002.dat | 1 |
| ... | | |
| 2 | test2001.dat | 1 |
| 2 | test2002.dat | 1 |
| ... | | |
| 3 | test3001.dat | 1 |
| 3 | test3002.dat | 1 |
| ... | | |
| 4 | test4001.dat | 1 |
| 4 | test4002.dat | 1 |
| ... | | |

TEST RESULT 1181

| CASE | TEST INPUT VALUE | OUTPUT VALUE |
|---|---|---|
| 1 | test1001.dat | 1 |
| 1 | test1002.dat | 1 |
| ... | | |
| 2 | test2001.dat | 1 |
| 2 | test2002.dat | 7 |
| ... | | |
| 3 | test3001.dat | 1 |
| 3 | test3002.dat | 1 |
| ... | | |
| 4 | test4001.dat | 1 |
| 4 | test4002.dat | 1 |
| ... | | |

FIG. 5

TEST EVALUATION RESULT    1201

| TEST CASE | EVALUATION RESULT |
|---|---|
| CASE 1 | BUG NOT DETECTED |
| CASE 2 | BUG DETECTED |
| CASE 3 | BUG NOT DETECTED |
| ... | |

FIG. 6

NEURON INFORMATION    1151

CASE 1 | CASE 2 | ...

| LAYER NO. | NEURON NO. | OUTPUT DATA |
|---|---|---|
| 1 | 1 | 0.00345 |
| 1 | 2 | 0.0872 |
| ... | | |
| 1 | 784 | 0.0381 |
| 2 | 1 | 0.0637 |
| 2 | 2 | 0 |
| ... | | |
| 2 | 1000 | |
| ... | | |
| 3 | 1000 | 0 |
| 4 | 1 | 0.00927 |
| 4 | 2 | 0.0192 |
| ... | | |
| 4 | 10 | 0.00389 |
| 1 | 1 | 0 |
| ... | | |

FIG. 7

COVERAGE INDEX                                                         1171

| # | COVERAGE INDEX NAME | COVERAGE CALCULATION METHOD |
|---|---|---|
| 1 | TOTAL COVERAGE | • X: NUMBER OF INTERMEDIATE NEURONS THAT HAVE EVER BEEN ACTIVATED (OUTPUT VALUE LARGER THAN 0)<br>• Y: TOTAL NUMBER OF INTERMEDIATE NEURONS<br>• COVERAGE = X/Y |
| 2 | LAYER COVERAGE | • $X\_n$ : NUMBER OF NEURONS IN THE INTERMEDIATE LAYER n THAT HAVE EVER BEEN ACTIVATED<br>• $Y\_n$ : TOTAL NUMBER OF NEURONS IN THE INTERMEDIATE LAYER n<br>• COVERAGE = $\min(X\_n)/(Y\_n)$ |
| 3 | ORDER COVERAGE | • $X\_n$ : NUMBER OF NEURONS THAT HAVE EVER OUTPUT THE LARGEST VALUE IN THE INTERMEDIATE LAYER n<br>• $Y\_n$ : TOTAL NUMBER OF NEURONS IN THE INTERMEDIATE LAYER n<br>• COVERAGE = $\Sigma(X\_n)/(\Sigma Y\_n)$ |
| 4 | CONCENTRATION COVERAGE | • $A\_t$ : NUMBER OF INTERMEDIATE LAYER NEURONS ACTIVATED BY EXECUTION OF TEST CASE t<br>• C : CONCENTRATION CONSTANT<br>• CONCENTRATION ADDED TO NEURONS s BY EXECUTION OF TEST CASE t<br>$D\_t$ = (s IS ACTIVATED)? $C/A\_t$:0<br>• CONCENTRATION OF NEURONS s $E\_s = \Sigma(D\_t)$<br>• X : NUMBER OF INTERMEDIATE LAYER NEURONS WHOSE COVER CONCENTRATION EXCEEDS PREDETERMINED THRESHOLD<br>• Y: TOTAL NUMBER OF INTERMEDIATE NEURONS<br>• COVERAGE = X/Y |
| 5 | CO-OCCURRENCE COMBINATION COVERAGE | • ANY PAIR OF INTERMEDIATE NEURONS p = (s,t)<br>• A : NUMBER OF TEST CASES IN WHICH NEURONS s AND t ARE ACTIVATED AT THE SAME TIME<br>• B : NUMBER OF TEST CASES IN WHICH NEURONS s ARE ACTIVATED<br>• C: NUMBER OF TEST CASES IN WHICH NEURONS t ARE ACTIVATED<br>• ACTIVATION CO-OCCURRENCE RATE OF p: $D\_p$ = A/B + C - A<br>• COVERAGE = $1/(1 + \Sigma(D\_p - (1/2))^2)$ |

FLOW OF MEASUREMENT UNIT FOR A PLURALITY OF COVERAGES

COVERAGE CALCULATION RESULT 1211

| NUMBER OF TESTS | NUMBER OF DETECTED BUGS | COVERAGE INDEX NAME | COVERAGE CALCULATION RESULT | SUPPLEMENTARY INFORMATION |
|---|---|---|---|---|
| ... | | | | |
| 106 | 3 | TOTAL COVERAGE | 0.42 | THE THIRD LAYER HAS THE SMALLEST VALUE |
| | | LAYER COVERAGE | 0.21 | |
| | | ORDER COVERAGE | 0.19 | |
| | | CONCENTRATION COVERAGE | 0.39 | |
| | | CO-OCCURRENCE COMBINATION COVERAGE | 0.27 | |
| 107 | 4 | | 0.50 | |
| ... | | | | |

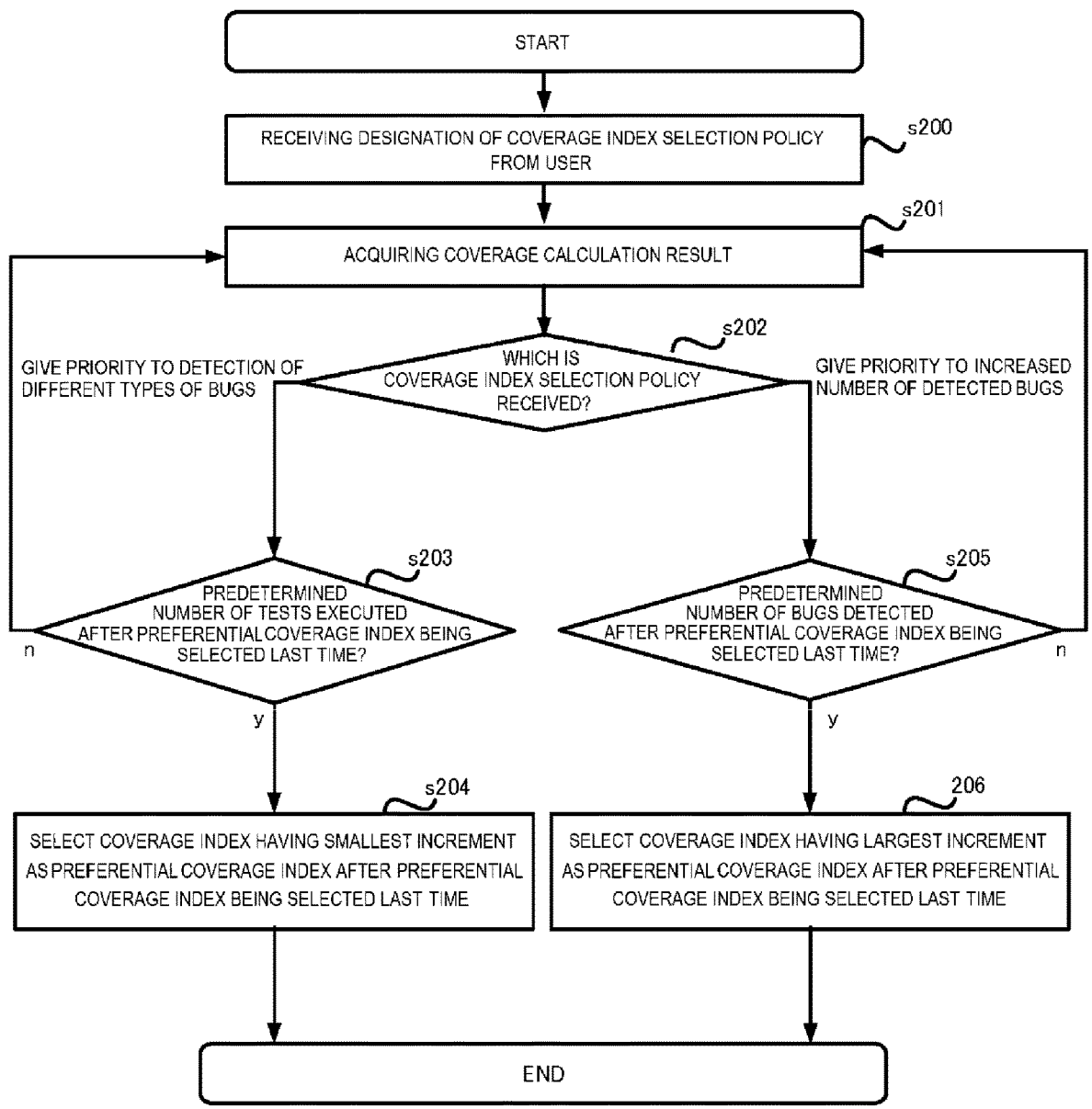

US 10,789,155 B2

COVERAGE TEST SUPPORT DEVICE AND COVERAGE TEST SUPPORT METHOD

CROSS-REFERENCE TO RELATED APPLICATIONS

The present application claims priority pursuant to 35 U.S.C. § 119 from Japanese Patent Application No. 2017-248710, filed on Dec. 26, 2017, the entire disclosure of which is incorporated herein by reference.

BACKGROUND

The present invention relates to a coverage test support device and a coverage test support method, particularly to a technique that can effectively detect a bug of any program created by machine learning.

In related art, in a program test, a coverage test has been used as a method to detect a bug (referring to a case where expected output cannot be obtained for certain input) that is difficult to be discovered.

In the coverage test, an execution pattern of a program to be tested is defined quantitatively by an index called coverage (hereinafter, referred to as coverage index). By repeating the test so that a value of the coverage index is improved, confirmation of the above execution pattern is made as comprehensive as possible.

Among programs to be tested, it has been known that a coverage index based on conditional branches such as IF statements is effective for bug detection in related procedural programs. In the coverage test, the number of test cases required to achieve a coverage ratio of 100% can be determined in advance based on a control flow of the program to be tested. For example, if $c0 \subset c1 \subset c2$, there is (almost) inclusion relation between the coverage indexes. And in proportion to an increase in the number of the test cases, possibility of detecting a bug is also increased. That is, with respect to the related procedural programs, effectiveness of each coverage index is evident before execution of the coverage test.

However, when a related coverage test is performed on a program created by machine learning such as a neural network, the value of the coverage index based on the conditional branch is always 100%. Therefore, for the program created by machine learning, the coverage test is not effective based on a related coverage index.

Therefore, a coverage index for a program created by a neural network and a method of automatically generating a test input value for improving the coverage index have been proposed (see Deep Xplore: Automated Whitebox Testing of Deep Learning Systems, SOSP '17, Colombia University).

In addition, as a related technique that is related to the coverage test, for example, a logic verification system has been proposed (see JP-A-2010-146037). The logic verification system performs logical verification by coordinating hardware and software. The logic verification system includes a test data generating unit for a random number, an information output unit for software coverage and an information output unit for hardware coverage. Validity of test data is evaluated based on changes of coverage output information when logical verification is executed, and only valid test data is selected and stored. When the test is re-executed, verification efficiency is improved by re-executing only valid test data, so that verification period is shortened.

Further, a software test support system (see JP-A-2015-200984) and the like have also been proposed. The software test support system includes an input condition generation unit that generates an input condition based on specification information of a program to be tested, a test technique determination unit that determines a test technique suitable for the program to be tested, and a pattern generation unit that generates a test pattern for the program to be tested based on the determined test technique.

SUMMARY

However, it is unknown whether the coverage test method for the program created by the neural network proposed by the above-described related technique is effective for any program created by the neural network. That is, there is a possibility that bugs cannot be detected efficiently even by adopting such a coverage test.

An object of the invention is to provide a technique that can effectively detect a bug of any program created by machine learning.

A coverage test support device for solving the above problems according to the invention includes: a memory device configured to store a test case including a plurality of pairs of test input values and expected output values and a specification content for each of a plurality of coverage indexes in relation to a program created by a neural network; and an arithmetic device configured to execute a process of sequentially giving a test input value of each pair in the test case to the program created by the neural network, executing a predetermined number of tests, and acquiring a test result of the tests and neuron information at the time of test execution, a process of applying the acquired neuron information to the specification content of each of the plurality of coverage indexes and calculating a value for each coverage index, and a process of identifying, among the coverage indexes, a coverage index in which an elongation rate of the calculated value shows a predetermined tendency, as a preferential coverage index that is to be used preferentially, when either the number of executions of the tests or the number of bugs in the test result exceeds a predetermined standard.

A coverage test support method according to the invention is characterized in that an information processing device, which includes a memory device configured to store a test case including a plurality of pairs of test input values and expected output values and a specification content for each of a plurality of coverage indexes in relation to a program created by a neural network, executes a process of sequentially giving a test input value of each pair in the test case to the program created by the neural network, executing a predetermined number of tests, and acquiring a test result of the tests and neuron information at the time of test execution, a process of applying the acquired neuron information to the specification content of each of the plurality of coverage indexes and calculating a value for each coverage index, and a process of identifying, among the coverage indexes, a coverage index in which an elongation rate of the calculated value shows a predetermined tendency, as a preferential coverage index that is to be used preferentially, when either the number of executions of the tests or the number of bugs in the test result exceeds a predetermined standard.

According to the invention, the possibility that a bug of any program created by machine learning can be effectively detected is increased.

BRIEF DESCRIPTION OF DRAWINGS

FIG. 5 is a diagram showing an exemplary configuration of data of a test evaluation result according to the embodiment;

FIG. 6 is a diagram showing an exemplary configuration of data of neuron information according to the embodiment;

FIG. 7 is a diagram showing an exemplary configuration of data of a coverage index according to the embodiment;

FIG. 11 is a diagram showing a flow example 2 of the coverage test support method according to the embodiment.

DETAILED DESCRIPTION OF THE EMBODIMENTS

Functional Configuration of Coverage Test Support Device

Figure 1:
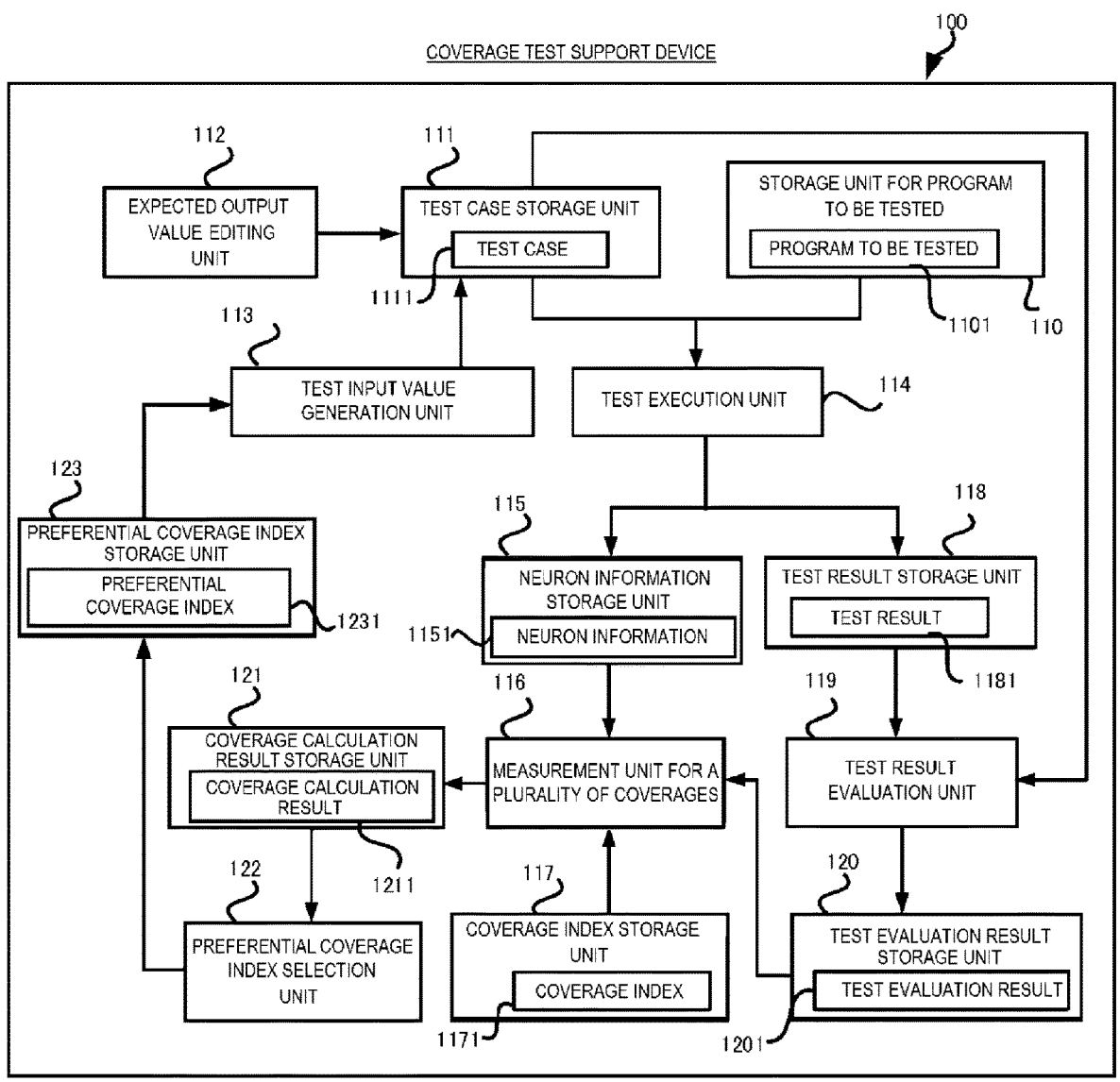
FIG. 1 is a diagram showing an exemplary configuration of a coverage test support device according to an embodiment.

Hereinafter, embodiments of the invention will be described in detail with reference to the drawings. FIG. 1 is a diagram showing an exemplary configuration of a coverage test support device 100 according to an embodiment. The coverage test support device 100 shown in FIG. 1 is a computing device that can effectively detect a bug of any program created by machine learning.

As shown in FIG. 1, the coverage test support device 100 includes a storage unit 110 for programs to be tested, a test case storage unit 111, an expected output value editing unit 112, a test input value generation unit 113, a test execution unit 114, a neuron information storage unit 115, a measurement unit 116 for a plurality of coverages, a coverage index storage unit 117, a test result storage unit 118, a test result evaluation unit 119, a test evaluation result storage unit 120, a coverage calculation result storage unit 121, a preferential coverage index selection unit 122 and a preferential coverage index storage unit 123. These are functional units mounted to cooperate with the programs and hardware provided in the coverage test support device 100.

The storage unit 110 for programs to be tested stores a program to be tested 1101. The program to be tested 1101 is a program created by a neural network. In the embodiment, an image recognition program is assumed as an example of the program to be tested 1101.

The test case storage unit 111 stores a test case 1111. The test case 1111 includes a plurality of pairs of test input values and expected output values. In a test case that is assumed as an example in the embodiment, image data that displays a number is taken as a test input value which is a recognized number when the image data is given to the above-described image recognition program, and an expected number is taken as an expected output value. In a case where the image recognition program, as the program to be tested, includes a bug, an output value thereof is a number different from the expected output value even when the test input value is given.

Further, the expected output value editing unit 112 receives editing from a user with respect to the above-described expected output value of the test case 1111, and upgrades the test case 1111.

Further, the test input value generation unit 113 calculates a test input value of the above-described test case 1111 in order to improve a value of a preferential coverage index to be described below in detail, and reflects the test input value in the test case 1111.

Further, the test execution unit 114 gives the test input value of the test case 1111, as an input, to the above-described program to be tested 1101 for execution, and an output value of the program to be tested 1101 is acquired as a test result. Further, the test execution unit 114 also acquires information of each neuron (neuron information) in each layer in the program to be tested 1101 when the test is executed.

Further, the neuron information storage unit 115 stores neuron information 1151 acquired through test execution by the above-described test execution unit 114. Details of the neuron information 1151 will be described below.

Further, the measurement unit 116 for a plurality of coverages calculates values for a plurality of coverage indexes based on the above-described neuron information 1151. Specification contents of the coverage indexes such as calculation formulas for the values of the coverage indexes are stored by the coverage index storage unit 117.

The coverage index storage unit 117 stores specification contents of each of the plurality of coverage indexes. Hereinafter, in order to simplify the description, the specification contents of each coverage index will be described as coverage indexes 1171. Details of the coverage indexes 1171 will be described below.

The test result storage unit 118 stores a test result 1181 acquired through the test execution by the above-described test execution unit 114. Details of the test result 1181 will be described below.

The test result evaluation unit 119 checks the above-described test case 1111 and the test result 1181 corresponding thereto, identifies a test case with a bug in which an output value shown by a test result is different from an expected output value, and generates a test evaluation result 1201. Details of the test evaluation result 1201 will be described below.

The test evaluation result storage unit 120 stores the above-described test evaluation result 1201.

The coverage calculation result storage unit 121 stores a coverage calculation result 1211 calculated by the above-described measurement unit 116 for a plurality of coverages.

The preferential coverage index selection unit 122 identifies, when either the number of executions of the above-described tests or the number of bugs in the test result 1181 exceeds a predetermined standard, a coverage index among the coverage indexes 1171 whose elongation rate shows a predetermined tendency as a preferential coverage index that is to be used preferentially, based on the above-described coverage calculation result 1211. Details of this process will be described below.

Further, the preferential coverage index storage unit 123 stores information of a preferential coverage index 1231. The information of the preferential coverage index 1231 is used to calculate a test input value in the above-described test input value generation unit 113.

———Hardware Configuration———

Figure 2:
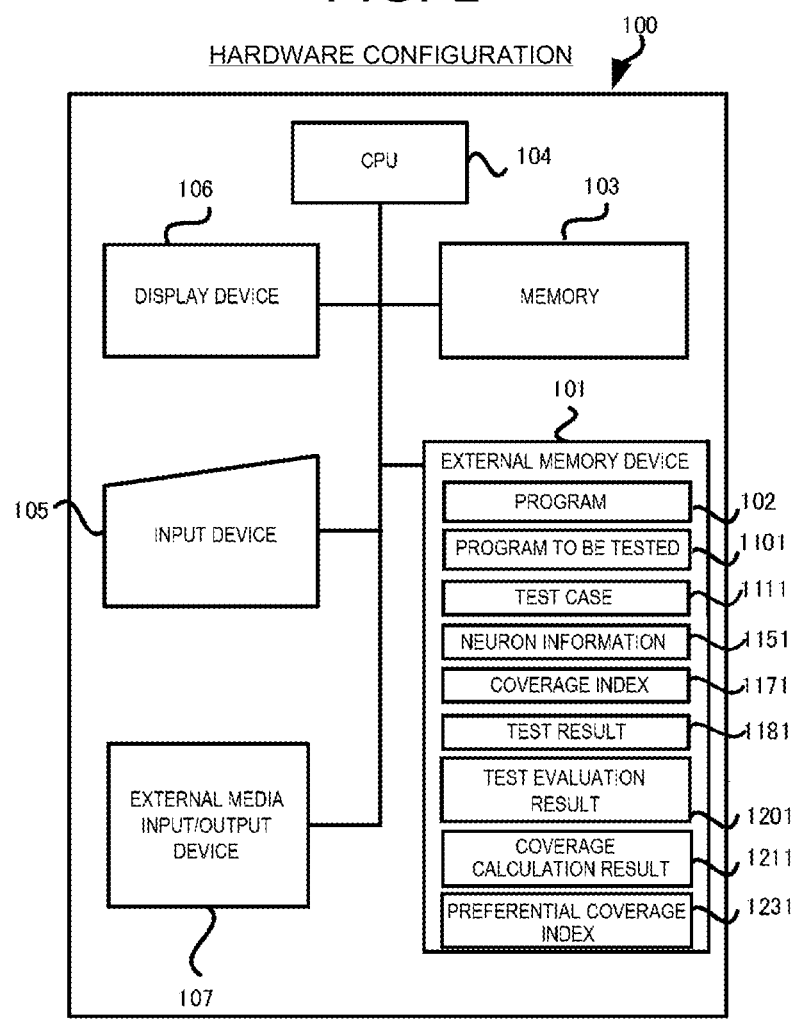
FIG. 2 is a diagram showing an exemplary configuration of hardware in the coverage test support device according to the embodiment.

Hardware configuration of the coverage test support device 100 in the embodiment is as follows. FIG. 2 shows an exemplary configuration of the hardware of the coverage test support device 100 according to the embodiment.

The coverage test support device 100 of the embodiment includes an external memory device 101, a memory 103, a CPU 104 (arithmetic device), an input device 105, an output device 106, and an external media input/output device 107.

The external memory device 101 is a storage unit constituted by appropriate nonvolatile memory elements such as a Solid State Drive (SSD) or a hard disk drive, for example.

The memory 103 is a storage unit constituted by volatile memory elements such as an RAM.

The CPU 104 is an arithmetic device that performs executions such as reading a program 102 stored in the memory device 101 to the memory 103, performs overall control of the device itself, and performs various determinations, calculations and control processes.

The input device 105 is an input device that receives key input and voice input from an appropriate user such as a person in charge of the coverage test.

The output device 106 is a display device such as a display for displaying processing data.

The external media input/output device 107 is a device that includes an interface connectable to various storage media such as a portable memory or a magnetic storage medium, and performs data exchange with the storage media. The information to be read from the above-described storage media by the external media input/output device 107 is the program to be tested 1101, the test case 1111 and the coverage index 1171.

The external memory device 101 stores, in addition to the program 102 for implementing functions necessary for the coverage test support device 100, at least the program to be tested 1101, the test case 1111, the neuron information 1151, the coverage indexes 1171, the test result 1181, the test evaluation result 1201, the coverage calculation result 1211, and the preferential coverage index 1231. Details of the information will be described below.

———Examples of Data Structure———

Figure 3:
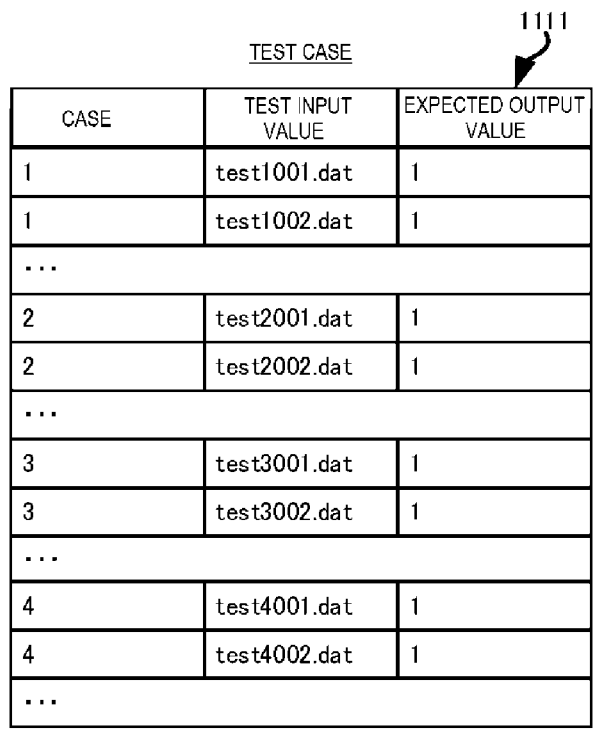
FIG. 3 is a diagram showing an exemplary configuration of data of a test case according to the embodiment.

Next, various types of information used by the coverage test support device 100 of the embodiment will be described. FIG. 3 shows an exemplary configuration of data of the test case 1111 according to the embodiment.

The test case 1111 of the embodiment is data read from an external medium by the above-described external media input/output device 107 and stored in the test case storage unit 111.

The data structure is a collection of stored records in which test input values and expected output values are associated with each test case. The test case 1111 shown in FIG. 3 shows an exemplary test case in which a certain image is taken as a test input value and a number "1" depicted by the image is taken as an expected output value.

The test input value in the above-described test case 1111 is upgraded by the test input value generation unit 113 by performing tuning. In this case, the test input value generation unit 113 identifies an intermediate layer neuron (in the neuron information 1151, neuron of each layer is specified) that improves the value of the preferential coverage index 1231 to be described below by a coverage calculation method of the coverage indexes 1171, applies an error backward propagation method to the intermediate layer neuron, calculates a test input value that is the value of an input layer in the program to be tested 1101, and takes the test input value as the test input value of the test case 1111.

With respect to handling of the error backward propagation method and the like, a known method may be appropriately applied.

Figure 4:
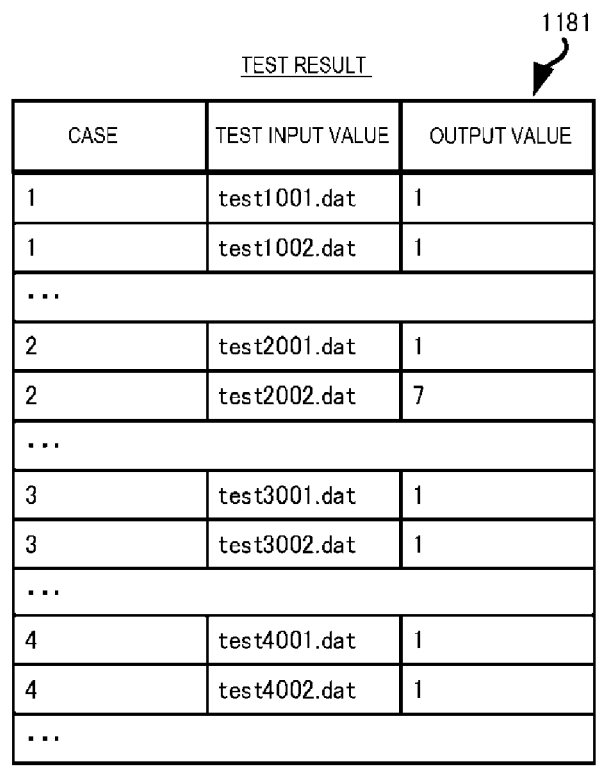
FIG. 4 is a diagram showing an exemplary configuration of data of a test result according to the embodiment.

Next, FIG. 4 shows an exemplary configuration of data of the test result 1181 in the embodiment. The test result 1181 of the embodiment stores an output value of the program to be tested 1101 to which the test input value of the above-described test case 1111 is given as an input.

The data structure is a collection of records in which the test input value and the output value is associated with each test case. In the test result 1181 shown in FIG. 4, a result example is shown in which an output value is "7" instead of an expected output value "1" in a test case "2" among the above-described test cases 1111.

Such a test result 1181 corresponds to a result of the test execution unit 114 of the coverage test support device 100 that executes a predetermined number of cases by sequentially giving the test input value of each pair in the test case 1111, with respect to the program to be tested 1101.

Subsequently, FIG. 5 shows an exemplary configuration of data of the test evaluation result 1201 in the embodiment. The test evaluation result 1201 is information that stores a result of a test case identified by the test result evaluation unit 119, in which an output value is different from an expected output value, that is, the test case has a bug. The data structure is a collection of records in which the evaluation results are associated with each test case. In the example of FIG. 5, an evaluation result of "bug detected" is shown with respect to a test case "2".

Subsequently, FIG. 6 shows an exemplary configuration of data of the neuron information 1151 in the embodiment. The neuron information 1151 of the embodiment is information that the test execution unit 114 acquires and stores values for neurons of each intermediate layer in the program to be tested 1101 that gave test input values of the above-described test case.

Its data structure is a collection of records in association with a neuron number that uniquely identifies a neuron of the intermediate layer and in association with output data of the neuron, with a layer number that uniquely identifies the intermediate layer as a key. In a case where the value of the output data is "0", an inactive state of the neuron is shown, and in a case where the value of the output data is a value other than "0", an active state of the neuron is shown. It can be said that the larger the value of the output data is, the more activated the neuron is.

Subsequently, FIG. 7 shows an exemplary configuration of data of the coverage indexes 1171 in the embodiment. The coverage indexes 1171 of the embodiment are used in evaluation of the program to be tested 1101 created by the neural network. As an example, a total of five types of coverage indexes are assumed which are a total coverage, a layer coverage, an order coverage, a concentration coverage and a co-occurrence combination coverage.

As shown in FIG. 7, the coverage indexes 1171 are a collection of records in which names of the coverage indexes are associated with the coverage calculation methods that are specification contents.

Further, among the above-described five types of coverage indexes, the total coverage is a coverage index obtained by dividing a number "X" of activated neurons (for example, the value of the output data is larger than 0) among neurons in all intermediate layers in the program to be tested 1101 by a total number "Y" of neurons in all the intermediate layers.

Further, for each intermediate layer n, a value is obtained by dividing a number "X_n" of activated neurons by a total number "Y_n" of neurons in the intermediate layer n, then the values are compared between the intermediate layers and the smallest value is the layer coverage.

Further, the order coverage is a coverage index obtained by dividing a value "$\Sigma X\_n$", which is obtained by adding up numbers "$X\_n$" of neurons that have output the largest value among neurons in the intermediate layer n for all the intermediate layers, by a value "$\Sigma Y\_n$", which is obtained by adding up total numbers "$Y\_n$" of neurons in the intermediate layer n for all the intermediate layers.

Further, every time one test case is executed, a cover concentration is calculated by dividing a predetermined concentration constant by the number of intermediate layer neurons activated by the execution of the test. The value of the cover concentration is added for each intermediate layer neuron, and the number of the intermediate layer neurons whose cover concentration exceeds a predetermined threshold is divided by a total number of the intermediate layers, thereby producing a coverage index which is the concentration coverage.

If the number of the intermediate layer neurons activated by execution of a test case t is "$A\_t$", the concentration constant is "C", the cover concentration added to an intermediate layer neuron s by the execution of the test case t is "$D\_t=(s\ is\ activated)?C/A\_t:0$", the cover concentration of the intermediate layer neuron subjected to such addition is "$E\_s=\Sigma(D\_t)$", the number of intermediate layer neurons whose cover concentration exceeds the predetermined threshold is "X" and the total number of the intermediate layer neurons is "Y", then the concentration coverage is obtained as "X/Y".

Further, for each neuron pair of the intermediate layer neurons, the number of test cases in which the neurons s and t are activated at the same time is divided by a value which is obtained by subtracting the number of test cases in which the neurons s and t are activated at the same time from a total of the number of test cases in which the neurons s are activated and the number of test cases in which the neurons t are activated, an activation co-occurrence rate is calculated and applied to a formula of $1/(1+\Sigma(\text{activation co-occurrence rate of each neuron pair}-\frac{1}{2})^2)$ to produce a coverage index which is the co-occurrence combination coverage.

Further, when an arbitrary pair of the intermediate layer neurons is "$p=(s, t)$", the number of test cases in which the neurons s and t are activated at the same time is "A", the number of test cases in which the neurons s are activated is "B", and the number of test cases in which the neurons t are activated is "C", an activation co-occurrence rate is obtained as "$D\_p=A/B+C-A$", and the co-occurrence combination coverage is represented as "$1/(1+\Sigma(D\_p-\frac{1}{2})^2)$".

——— Flow Example 1 ———

Hereinafter, actual procedures of the coverage test support method in the embodiment will be described with reference to the drawings. Various operations corresponding to the coverage test support method described below are realized by the program 102 that is read into a memory or the like and is executed by the coverage test support device 100. Further, the program 102 includes codes for performing the various operations described below.

Figures 8, 9:
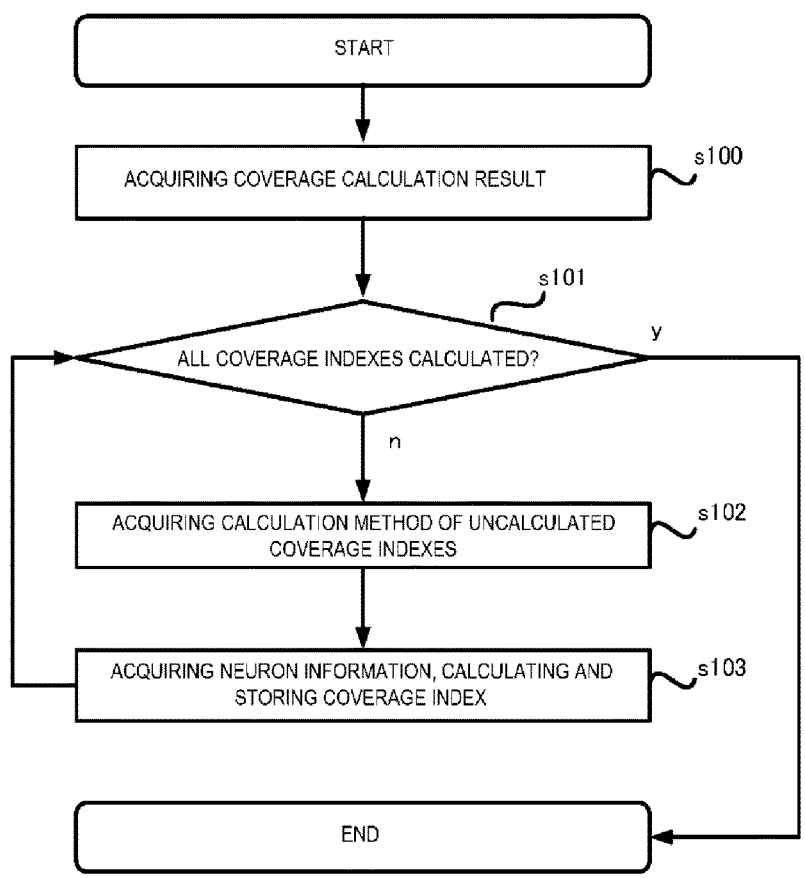
FIG. 8 is a diagram showing a flow example 1 of a coverage test support method according to the embodiment.
FIG. 9 is a diagram showing an exemplary configuration of a coverage calculation result according to the embodiment.

FIG. 8 is a diagram showing a flow example 1 of the coverage test support method according to the embodiment. In this case, the measurement unit 116 for a plurality of coverages of the coverage test support device 100 accesses the coverage calculation result storage unit 121 to acquire the coverage calculation result 1211 (s100).

FIG. 9 shows an exemplary configuration of data of the coverage calculation result 1211 according to the embodiment. In the example of FIG. 9, as a result of performing a total number of "106" test cases, the number of bugs detected is "3", and a value of the coverage calculation result is set for each of the five types of coverage indexes described in the coverage index name column. That is, the state of this record is a state in which calculation is completed with respect to all five types of coverage indexes.

Subsequently, the measurement unit 116 for a plurality of coverages determines whether values for the five types of coverage indexes in the coverage calculation result column are set respectively, with reference to the coverage calculation result 1211 obtained in s100, so as to determine whether all the coverage indexes have already been calculated (s101).

In a case where all the coverage indexes have already been calculated (s101:y) according to the above-described determination result, the measurement unit 116 for a plurality of coverages terminates the flow.

Meanwhile, in a case where all the coverage indexes have not already been calculated (s101:n) according to the above-described determination result, the measurement unit 116 for a plurality of coverages accesses the coverage index storage unit 117 and acquires calculation method information of uncalculated coverage indexes with reference to the coverage indexes 1171 (s102).

Next, the measurement unit 116 for a plurality of coverages acquires the neuron information 1151 by accessing the neuron information storage unit 115, and the value of the coverage index is calculated by applying the neuron information 1151 to the calculation method acquired in s102 and is stored in the coverage calculation result 1211 (s103).

After executing the process of s103, the measurement unit 116 for a plurality of coverages shifts the process to s101, and repeatedly executes s102 to s103 until calculation of all types of coverage indexes specified by the coverage indexes 1171 is completed (s101:y). As a result, the value in the coverage calculation result column is set for each of the five types of coverage indexes, as the coverage calculation result 1211 shown in FIG. 9.

Figure 10A:
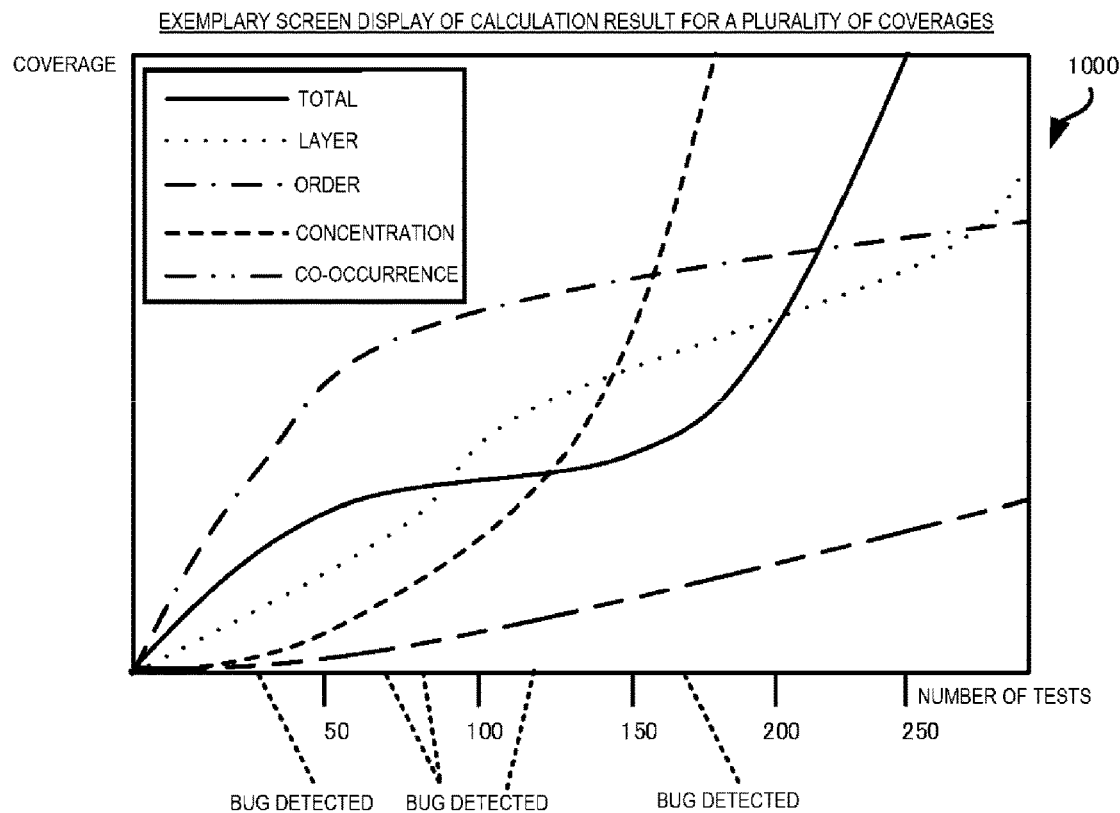
FIG. 10A is a diagram showing an exemplary screen display 1 according to the embodiment.
Figure 10B:
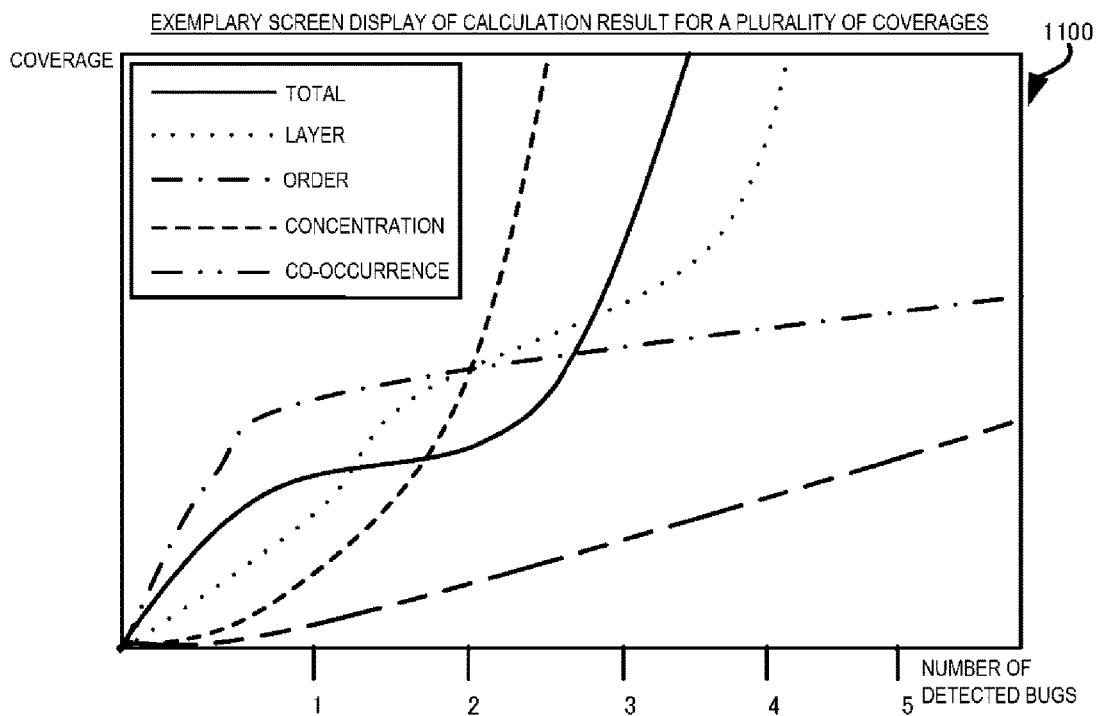
FIG. 10B is a diagram showing an exemplary screen display 2 according to the embodiment.

Incidentally, the measurement unit 116 for a plurality of coverages reflects the contents of the above-described coverage calculation result 1211 on the diagram objects in graphs 1000 and 1100 shown in FIG. 10A and FIG. 10B respectively, and the contents may be output to the display device 106.

In this case, the measurement unit 116 for a plurality of coverages draws the number of tests in the coverage calculation result 1211 on the horizontal axis, the values of the coverage calculation result corresponding to the number of tests on the vertical axis and the curve for each type of coverage index using an appropriate graph software or the like to generate the graph 1000.

Similarly, the measurement unit 116 for a plurality of coverages draws the number of detected bugs in the coverage calculation result 1211 on the horizontal axis, the values of the coverage calculation result corresponding to the number of tests on the vertical axis and the curve for each type of coverage index using an appropriate graph software or the like to generate the graph 1100.

——— Flow Example 2 ———

Subsequently, the flow will be described based on the preferential coverage index selection unit 122. FIG. 11 is a diagram showing a flow example 2 of the coverage test support method according to the embodiment.

In this case, the preferential coverage index selection unit 122 receives designation of a coverage index selection policy from an appropriate user such as a person in charge of the test via the input device 105 (s200).

The coverage index selection policy is based on the following concepts. For example, with respect to the program to be tested 1101, it is assumed that when a certain number of test cases are applied and the tests are executed, bugs of a predetermined number or more are detected. In that case, if a calculated value of a coverage index shows elongation above a predetermined standard than a value at the time of the previous execution, it can be said that the coverage index is excellent from a viewpoint of detecting a bug. Therefore, the test is performed to further elongate the coverage index having good elongation so that more bugs can be detected.

Meanwhile, when the certain number of test cases are applied and the tests are executed, if the calculated value of the coverage index only shows elongation below the predetermined standard than the value at the time of previous execution, it can be said that, in the coverage index, only the same parts are tested and that even if a bug can be detected, only the same bug is detected. Therefore, the test is performed to further elongate the coverage index having poor elongation so that different parts can be tested.

Accordingly, the above-described user designates either a preference for detecting a different type of bug or a preference for increasing the number of detected bugs, as the above-described coverage index selection policy.

Next, the preferential coverage index selection unit 122 accesses the coverage calculation result storage unit 121 and acquires the coverage calculation result 1211 (s201).

Subsequently, the preferential coverage index selection unit 122 determines whether the coverage index selection policy designated in s200 is the preference for detecting a different type of bug or the preference for increasing the number of detected bugs (s202).

In a case where the coverage index selection policy received from the user is the preference for detecting a different type of bug (s202: detecting a different type of bug preferentially) according to the above-described determination result, the preferential coverage index selection unit 122 determines whether a predetermined number of tests have been executed after the preferential coverage index is selected last time (s203).

Upon this determination, the preferential coverage index selection unit 122, for example, accesses the preferential coverage index storage unit 123, identifies the storage date and time of the preferential coverage index 1231, and identifies the number of tests executed after the storage date and time with reference to the number of tests column of the coverage calculation result 1211. Here, it is assumed that storage date and time is assigned to each record of the coverage calculation result 1211.

In a case where the predetermined number of tests have been executed (s203:y) according to the above-described determination result, the preferential coverage index selection unit 122 selects a coverage index having the smallest increment based on the value in each column of the coverage calculation result and the coverage index name in the coverage calculation result 1211 after the preferential coverage index is selected last time, stores the coverage index having the smallest increment in the preferential coverage index 1231 (s204), and terminates the process.

Meanwhile, in a case where the predetermined number of tests have not been executed (s203:n) according to the determination result in s203, the preferential coverage index selection unit 122 returns the process to s201.

Meanwhile, in a case where the coverage index selection policy designated in s200 is the preference for increasing the number of detected bugs (s202: increasing the number of detected bugs preferentially) according to the determination result in s202, the preferential coverage index selection unit 122 determines whether a predetermined number of bugs have been detected since latest selection of the preferential coverage index (s205).

Upon this determination, the preferential coverage index selection unit 122, for example, accesses the preferential coverage index storage unit 123, identifies the storage date and time of the preferential coverage index 1231, and identifies the number of bugs detected after the storage date and time with reference to the number of bugs detected of the coverage calculation result 1211 (date and time is assigned to each record of the coverage calculation result 1211).

In a case where the predetermined number of bugs are not detected (s205:n) according to the above-described determination result, the preferential coverage index selection unit 122 returns the process to s201.

Meanwhile, in a case where the predetermined number of bugs are detected (s205:y) according to the above-described determination result, the preferential coverage index selection unit 122 selects a coverage index having the largest increment based on the value in each column of the coverage calculation result and the coverage index name in the coverage calculation result 1211 after the preferential coverage index is selected last time, stores the coverage index having the largest increment in the preferential coverage index 1231 (s206), and terminates the process.

Although the preferred modes for carrying out the invention and the like have been specifically described above, the invention is not limited thereto and various modifications can be made without departing from the gist thereof.

According to the embodiment, a bug of any program created by machine learning can be effectively detected.

At least the following will be clarified by the description of this specification. That is, in the coverage test support device of the embodiment, the arithmetic device may identify neuron information that improves a value of the preferential coverage index in the specification contents, apply an error backward propagation method with respect to the neuron information, calculate a test input value that is value of an input layer in the program, and further execute a process of reflecting the test input value in the test case.

Accordingly, it is possible to reflect the test input value that improves the preferential coverage index that is a suitable coverage index, to a next test. Further, a bug of any program created by machine learning can be detected more effectively.

Further, in the coverage test support device of the embodiment, the memory device may store, as the specification content of the coverage index, at least two specification contents selected from a total coverage that shows a ratio between the number of intermediate layer neurons activated and the total number of intermediate layer neurons in the program, a layer coverage that has the smallest value among ratios between the number of activated neurons in each intermediate layer and the total number of intermediate layer neurons in the program, an order coverage that shows a ratio between the number of intermediate layers that have ever output the largest value when a neuron and an output value of the same layer in the program are compared and the total number of intermediate layer neurons, a concentration coverage that shows a ratio between the number of intermediate layer neurons whose cover concentration exceed a predetermined threshold for each intermediate layer neuron and the total number of intermediate layer neurons based on a ratio between a predetermined constant of each test case execution and the number of intermediate layer neurons activated, and a co-occurrence combination coverage that shows a ratio between an activation co-occurrence rate of each pair of neurons in the program and the total number of the pair of neurons in the intermediate layers. The arithmetic device may calculate a value of a coverage index that stores the specification contents in the memory device among the total coverage, the layer coverage, the order coverage, the concentration coverage and the co-occurrence combination coverage when a value of each of the coverage indexes is calculated.

Accordingly, it is possible to select a suitable coverage index, for a program created by a neural network, from among coverage indexes fitted to characteristics of the program. Further, a bug of any program created by machine learning can be detected more effectively.

Further, in the coverage test support device of the embodiment, the arithmetic device may generate predetermined diagram objects that show the number of executions of the tests, the number of bugs shown by the test result and calculation result of each coverage index, and may further execute a process of displaying the diagram objects on the output device.

Accordingly, it is possible for a person in charge of the coverage test or the like to present suitable reference information for selecting the preferential coverage index in an easy-to-understand manner. Further, a bug of any program created by machine learning can be detected more effectively.

Further, in the coverage test support method of the embodiment, the information processing device may identify neuron information that improves the value of the preferential coverage index in the specification contents, apply an error backward propagation method with respect to the neuron information, calculate a test input value that is the value of an input layer in the program, and further execute a process of reflecting the test input value in the test case.

Further, in the coverage test support method of the embodiment, the information processing device may store, as the specification content of the coverage index in the memory device, at least two specification contents of a total coverage that shows a ratio between the number of intermediate layer neurons activated and the total number of intermediate layer neurons in the program, a layer coverage that has the smallest value among ratios between the number of activated neurons in each intermediate layer and the total number of intermediate layer neurons in the program, an order coverage that shows a ratio between the number of intermediate layers that have ever output the largest value when a neuron and an output value of the same layer in the program are compared and the total number of intermediate layer neurons, a concentration coverage that shows a ratio between the number of intermediate layer neurons whose cover concentration exceed a predetermined threshold for each intermediate layer neuron and the total number of intermediate layer neurons based on a ratio between a predetermined constant of each test case execution and the number of intermediate layer neurons activated, and a co-occurrence combination coverage that shows a ratio between an activation co-occurrence rate of each pair of neurons in the program and the total number of the pair of neurons in the intermediate layers. The information processing device may also calculate a value of a coverage index that stores the specification contents in the memory device among the total coverage, the layer coverage, the order coverage, the concentration coverage and the co-occurrence combination coverage when a value of each of the coverage indexes is calculated.

Further, in the coverage test support method of the embodiment, the information processing device may generate predetermined diagram objects that show the number of executions of the tests, the number of bugs shown by the test result and the calculation result of each coverage index, and may further execute a process of displaying the diagram objects on the output device.

Although the present disclosure has been described with reference to example embodiments, those skilled in the art will recognize that various changes and modifications may be made in form and detail without departing from the spirit and scope of the claimed subject matter.

What is claimed is:

1. A coverage test support device comprising:
   a memory device configured to store a test case including a plurality of pairs of test input values and expected output values, and a coverage calculation for each of a plurality of coverage types in relation to a program created by a neural network; and
   an arithmetic device configured to execute
      a process of sequentially giving a test input value of each pair in the test case to the program created by the neural network, executing a predetermined number of tests, and acquiring a test result of the tests,
      a process of acquiring, via the neural network, neuron information in each of a plurality of intermediate layers at the time of test execution,
      a process of applying the acquired neuron information to the coverage calculation of each of the plurality of coverage types and calculating a value for each coverage type, and
      a process of identifying, among the coverage types, a coverage type in which an elongation rate of the calculated value shows a predetermined tendency, as a preferential coverage type that is to be used preferentially, when either the number of executions of the tests or the number of bugs in the test result exceeds a predetermined standard, and
   wherein the arithmetic device further executes a process of identifying neuron information by performing the coverage calculation of the preferential coverage type, applying an error backward propagation method to the neuron information, calculating a test input value that is a value of an input layer in the program, and reflecting the test input value in the test case.

2. The coverage test support device according to claim 1, wherein the memory device stores, as an equation of the coverage type, at least two coverage calculations selected from a total coverage that shows a ratio between the number of intermediate layer neurons activated and a total number of intermediate layer neurons in the program, a layer coverage that has a smallest value among ratios between the number of activated neurons in each intermediate layer and the total number of intermediate layer neurons in the program, an order coverage that shows a ratio between the number of intermediate layer neurons that have ever output a largest value when a neuron and an output value of the same layer in the program are compared and the total number of intermediate layer neurons, a concentration coverage that shows a ratio between the number of intermediate layer neurons whose cover concentration exceeds a predetermined threshold for each intermediate layer neuron and the total number of intermediate layer neurons based on a ratio between a predetermined constant of each test case execution and the number of intermediate layer neurons activated, and a co-occurrence combination coverage that shows a ratio between an activation co-occurrence rate of each pair of neurons in the program and the total number of the pair of neurons in the intermediate layers, and the arithmetic device calculates a value of a coverage type that stores the coverage calculation in the memory device among the total coverage, the layer coverage, the order coverage, the concentration coverage and the co-occurrence combination coverage when a value of each of the coverage types is calculated.

3. The coverage test support device according to claim 1, wherein the arithmetic device further executes a process of generating a predetermined drawing object that shows the number of executions of the tests, the number of bugs shown by the test result and a calculation result of each coverage type, and displaying the drawing object on an output device.

4. A coverage test support method wherein an information processing device including a memory device configured to store a test case including a plurality of pairs of test input values and expected output values and a coverage calculation for each of a plurality of coverage types in relation to a program created by a neural network, executes a process of sequentially giving a test input value of each pair in the test case to the program created by the neural network, executing a predetermined number of tests, and acquiring a test result of the tests, a process of acquiring, via the neural network, neuron information in each of a plurality of intermediate layers at the time of test execution, a process of applying the acquired neuron information to the coverage calculation of each of the plurality of coverage types and calculating a value for each coverage type, and a process of identifying, among the coverage types, a coverage type in which an elongation rate of the calculated value shows a predetermined tendency, as a preferential coverage type that is to be used preferentially, when either the number of executions of the tests or the number of bugs in the test result exceeds a predetermined standard, and wherein the information processing device further executes a process of identifying neuron information by performing the coverage calculation of the preferential coverage type, applying an error backward propagation method to the neuron information, calculating a test input value that is value of an input layer in the program, and reflecting the test input value in the test case.

5. The coverage test support method according to claim 4, wherein the information processing device stores, as an equation of the coverage type in the memory device, at least two coverage calculations selected from a total coverage that shows a ratio between the number of intermediate layer neurons activated and a total number of intermediate layer neurons in the program, a layer coverage that has the smallest value among ratios between the number of activated neurons in each intermediate layer and the total number of intermediate layer neurons in the program, an order coverage that shows a ratio between the number of intermediate layers that have ever output the largest value when a neuron and an output value of the same layer in the program are compared and the total number of intermediate layer neurons, a concentration coverage that shows a ratio between the number of intermediate layer neurons whose cover concentration exceeds a predetermined threshold for each intermediate layer neuron and the total number of intermediate layer neurons based on a ratio between a predetermined constant of each test case execution and the number of intermediate layer neurons activated, and a co-occurrence combination coverage that shows a ratio between an activation co-occurrence rate of each pair of neurons in the program and a total number of the pairs of neurons in the intermediate layers, and calculates a value of a coverage type that stores the coverage calculation in the memory device among the total coverage, the layer coverage, the order coverage, the concentration coverage and the co-occurrence combination coverage when a value of each of the coverage types is calculated.

6. The coverage test support method according to claim 4, wherein the information processing device further executes a process of generating a predetermined drawing object that shows the number of executions of the tests, the number of bugs shown by the test result and a calculation result of each coverage type, and displaying the drawing object on an output device.

* * * * *